3,061,592
PROCESS FOR THE PRODUCTION OF POLY-AMIDES FROM CYCLIC LACTAMS IN PEARLY FORM

Hermann Schnell, Krefeld-Uerdingen, and Joachim Nentwig, Krefeld-Bochum, Germany, assignors to Farbenfabriken Bayer Aktiengesellschaft, Leverkusen, Germany, a corporation of Germany
No Drawing. Filed Jan. 21, 1959, Ser. No. 788,030
Claims priority, application Germany Feb. 1, 1958
5 Claims. (Cl. 260—78)

This invention is concerned with a process for the production of polyamides in the form of spheroidal granules resembling pearls from cyclic lactams.

For the conversion of polyamides produced from cyclic lactams into formed bodies, in most cases the viscous polyamide melts obtained during the production are not worked up directly. On the contrary, these are spun from the polymerization autoclave in the form of a strip or coarse thread and the strip or coarse thread is converted into a granulate by chopping up or cutting up. This granulate can then be washed with water and dried in order to remove any monomeric lactam which is still present. The granulate can then be stored or transported and can, according to requirements, be worked up via the fused masses with injection moulding machines to give formed bodies or with extruders to give threads, bristles, films, hollow bodies or hollow foils.

The present invention renders possible the production of polyamides from cyclic lactams in such a manner that they are obtained immediately in a suitable pearly form for storing, transporting or further working up so that a special spinning to threads and the cutting up of the threads is omitted.

The process according to the invention consists in that polymerizable cyclic lactams are suspended in inert fluids or melts in which the lactams are insoluble or only slightly soluble at polymerization temperatures lying above the melting point of the lactam but below the softening point of the polyamide. If desired, known catalysts and possibly accelerators and dispersion agents are added thereto. The mixture is brought to the polymerization temperatures within the mentioned range and, at the end of the polymerization, the polymerizate is separated off and if necessary, washed and dried in a known manner.

In this manner, the greater part of the polymerized lactam is obtained in the form of equal and more or less well formed spheroids which can easily be separated, for example, by decanting or filtering from the suspension agent. The so obtained pearly bodies are, if desired, after washing with water and drying, suitable without further treatment for working up with the usual type of apparatus such as worm presses, injection moulding machines and extruders.

As already mentioned, the polymerization of the lactam in the process according to the present invention takes place at a temperature which lies above the melting point of the lactam but below the softening point of the polyamides obtained therefrom. That the polymerization of that type of lactam can be carried out at such temperatures is certainly known, but, hitherto, this reaction condition had only been used in the case of block polymerization. In the case of the present process, the polymerization is preferably commenced at temperatures which lie only slightly above the melting point of the lactam and the temperature is increased with advancing polymerization, for example, in the course of about 1–5 hours to, for example, 100–150°. The temperatures used initially and in the course of the polymerization influence the size of the pearly bodies obtained. The higher the temperature chosen, the finer the size of the polymerizate obtained.

In order to bring the melted lactam into a fine state of division in the suspension agent, it is generally expedient to stir the mixture well. The speed of stirring also influences the size of the pearly bodies; the slower the stirring the larger the size of the pearly bodies. On the other hand, however, the speed of stirring has only a slight influence on the yield of polyamide pearly bodies.

All cyclic lactams known for the production of polyamides are suitable for the present process that is to say all lactams with at least 7 ring members, especially ε-caprolactam, the ε-methylcaprolactams and the lactams of ω-aminooenanthoic acid and ω-aminoundecanoic acid.

As inert fluids or melts which do not dissolve the lactam or only slightly dissolve the lactam when hot, there are preferably used long chain, saturated, aliphatic hydrocarbons or their technical mixtures or also their mixtures with other solvents. There may be especially mentioned, for example, paraffinic oils and paraffins of middle and high solidification point. Silicone oils are also very suitable. These materials dissolve, for example, ε-caprolactam at temperatures up to about 100° C., only slightly and are therefore suitable for the process.

The concentration of the lactams to be polymerized in suspension agents of this type can vary within wide limits. Suitable concentrations lie, for example, between about 15 and about 60 percent.

As catalysts, there may be mentioned especially alkaline compounds, such as alkali metals, alkali metal and alkaline earth metal hydrides, alkali metal carbonates and alkali metal salts of phenols or carboxylic acids.

Among the accelerators which may possibly be used, there may be mentioned, for example, isocyanates, carbodiimides and cyanamides, as described, for example, in U.S. patent application Ser. No. 676,488, filed August 6, 1957, now Patent No. 3,015,652. Nevertheless, all other suitable catalyst-accelerator combinations are also suitable for the present process.

Compounds set forth in the above mentioned patent application are, for example, butylisocyanate, hexylisocyanate, octylisocyanate, cyclohexylisocyanate, phenylisocyanate, chlorophenylisocyanate, naphthylisocyanate, di-isopropyl-carbodiimide, dibutyl-carbodiimide, dioctyl-carbodiimide, dicyclohexyl - carbodiimide, N,N - dimethyl - cyanamide, N - cyclohexyl - N - methyl - cyanamide, N,N - dicyclohexyl - cyanamide, N - phenyl - N - methyl - cyanamide or N,N - diphenyl - cyanamide, N,N-di-(chlorophenyl)-cyanamide, or compounds may be used which split off under the reaction conditions the aforesaid compounds such as the so-called isocyanate-splitters, e.g., dimer isocyanates [O. Bayer, Angewandte Chemie, A 59 (1947), 267].

In order to prevent the sticking together of the polyamide resulting by the polymerization into large lumps or to prevent it adhering to the wall of the reaction vessel, it is, as already mentioned, also expedient to add a dispersion agent. Finely divided solid compounds which are inert to the catalysts and accelerators and do not dissolve in the suspension agent act as such dispersion agents, for instance finely divided talcum. The most suitable for this purpose are polyamide powders of the same type as the polyamide to be produced in pearly form. In this manner, the desired object is achieved without the use of a foreign material which would possibly have to be again removed from the polyamide at the termination of the polymerization. Since in the case of the present application, a definite part of the polyamide is generally obtained in the form of a more or less fine powder, it is most expedient to add a definite amount of the polyamide powder to the new starting material at the very beginning, the polyamide powder added being a byproduct obtained from a previous polymerization reaction.

When pigments are added to the starting mixture, for example, carbon black or titanium dioxide, the pigments are included into the polyamide pearly bodies obtained.

For the working up of the reaction mixture it is generally preferred to filter the mixture. After drying the polyamide pearly bodies separated in this manner, most of the polyamide powder obtained in small amounts at the same time can be separated off by sieving. The filtrate usually still contains a little monomeric lactam which can be used again in a subsequent polymerization.

The following examples are given for the purpose of illustrating the invention:

Example 1

100 grams $\epsilon$-caprolactam, 200 grams of a hydrogenated kerosene mixture (B.P. 70–105° C./10 mms.) and 5 grams polyaminocapronic acid powder (grain size $<300\mu$) are heated in a well-cleaned 500 ccm. 3-necked flask provided with a thermometer, stirrer and descending condenser. 54 grams of the hydrogenated kerosene mixture are distilled off under water pump vacuum in order to remove any traces of moisture still present. After the addition of 300 milligrams sodium and 2 ccm. phenyl isocyanate, the mixture is maintained at 80° C. for one hour, then brought to 100° C. in the course of ½ hour, to 110° C. in the course of a further ½ hour and then maintained at this temperature for 45 minutes. The mixture is hot filtered. The residue of 62 grams moist polyamide is dried in vacuo at 130° C. The 54 grams of dry product obtained consists of 45 grams polyamide pearls with a diameter of about 1 mm. and 9 grams polyamide powder with a grain size of $<300\mu$. Extendable threads can be drawn from the polyamide pearls after melting.

Example 2

50 grams $\epsilon$-caprolactam, 200 grams of a hydrated kerosene mixture, 5 grams polyaminocapronic acid powder (grain size $<300\mu$) and 0.5 gram carbon black are polymerized in the manner described in Example 1 with the addition of 150 milligrams sodium and 0.5 ccm. n-butyl isocyanate. 20 grams dry, black pigmented polyamide are obtained comprising 16 grams pearly bodies with a diameter of about 1 mm. and 4 grams powder with a grain size of $<300\mu$.

Example 3

70 grams $\epsilon$-caprolactam, 150 grams paraffin with a solidification point of 42° C. and 5 grams polyaminocapronic acid powder (grain size $<300\mu$) are heated in the apparatus described in Example 1. 22 grams caprolactam are distilled off under a water pump vacuum in order to remove any traces of moisture still present. After the addition of 150 milligrams sodium, the temperature is maintained at 130° C. for one hour, is then cooled to 80° C. and 1 ccm. phenyl isocyanate added at this temperature. The temperature is maintained at 80° C. for two hours and then increased to 130° C. in the course of 1½ hours. The reaction mixture is hot filtered and the residue, a mixture of polyamide in pearl and powder form, washed with cyclohexane. After washing with water and drying, there are obtained 16 grams pearly bodies with a diameter of approximately 2 mms. and 2.5 grams powder with a grain size of $<300\mu$.

Example 4

120 grams caprolactam and 1 gram talcum as dispersion agent are heated in a 500 ccm. 3-necked flask provided with a thermometer, stirrer, tube for introducing nitrogen and descending condenser and 20 grams lactam are distilled off in vacuo (20 mms. mercury gauge) for the removal of residual amounts of moisture. After cooling in a stream of nitrogen to 80° C., 2.09 mol percent potassium are added. After a short time, about 10–15 minutes, the formation of the potassium-lactam compound is completed. 200 grams silicone oil are added as suspension agent, the temperature being maintained at 80° C. Subsequently, 0.25 milliliter hexamethylene diisocyanate are added as accelerator. The temperature is increased to 110° C. After about 5 minutes the reaction commences and leads to the formation of pearly bodies. After three hours the reaction is broken off. The yield of polyamide, referred to the amount of lactam used, amounts to 99 percent of which 90 percent are pearly bodies. The relative viscosity of the pearly bodies in 1 percent solution in cresol amounts to 4.52 at 25° C.

Example 5

The procedure described in Example 4 is repeated but wtihout the use of a dispersion agent. Furthermore, only 1.78 mol percent potassium are used, together with 0.25 milliliter phenyl isocyanate and 0.25 milliliter hexamethylene diisocyanate as accelerator. The polyamide yield amounts to 97 percent of which 60 percent are pearly bodies. The relative viscosity in 1 percent cresol solution amounts to 3.33 at 25° C.

We claim:

1. Process for the production of polyamides in pearly form which comprises suspending a monomeric polymerizable monocyclic lactam of an aliphatic $\omega$-amino carboxylic acid with 7 to 12 ring members in an inert organic suspension agent, in which said lactam is substantially insoluble, selected from the group consisting of long-chain saturated aliphatic hydrocarbons, a technical mixture of such hydrocarbons, a mixture of such hydrocarbons with a solvent and a silicone oil, adding to that lactam suspension a basic lactam polymerizing catalyst selected from the group consisting of alkali metals, alkali metal and alkaline earth metal hydrides, alkali metal carbonates and alkali metal salts of phenols and carboxylic acids, a lactam polymerizing accelerator selected from the group consisting of organic isocyanates, carbodiimides, and cyanamides, and a finely divided dispersion agent selected from the group consisting of polyamide powder and finely divided talcum, agitating the suspension and heating said suspension to a temperature above the melting point of the lactam but below the softening point of the polyamide.

2. Process according to claim 1 wherein the finely divided dispersion agent is a polyamide powder composed of particles having the same composition as the polyamide that is to be produced in the process.

3. Process according to claim 1, wherein the lactam used is selected from the group consisting of $\epsilon$-caprolactam, $\epsilon$-methylcaprolactams, and lactams of $\omega$-aminooenanthoic acid and of $\omega$-aminoundecanoic acid.

4. Process according to claim 1, wherein the concentration of lactam in the suspension agent is between 15 and 60 percent by weight.

5. Process according to claim 1, wherein the long chain aliphatic hydrocarbon used as inert organic dispersion agent is a paraffin with a middle to high solidification point.

References Cited in the file of this patent

UNITED STATES PATENTS 2,865,895    Peiper et al. _____ Dec. 23, 1958

FOREIGN PATENTS 218,129    Australia _____ Nov. 20, 1958
614,625    Great Britain _____ Dec. 20, 1948